Figure 1:
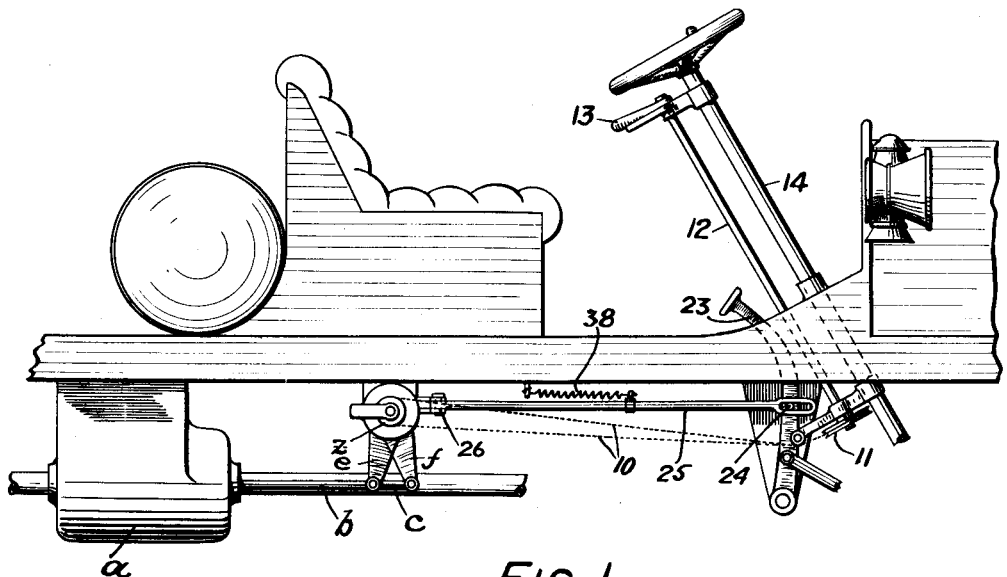

D. C. LEWIS.
MECHANICALLY OPERATED GEAR CHANGING MECHANISM FOR AUTOMOBILES.
APPLICATION FILED MAY 16, 1913.

1,092,922.

Patented Apr. 14, 1914.
3 SHEETS—SHEET 1.

WITNESSES:

INVENTOR
Dean C. Lewis
BY Frank S. Busser
ATTORNEY.

D. C. LEWIS.
MECHANICALLY OPERATED GEAR CHANGING MECHANISM FOR AUTOMOBILES.
APPLICATION FILED MAY 16, 1913.
1,092,922.
Patented Apr. 14, 1914.
3 SHEETS—SHEET 2.
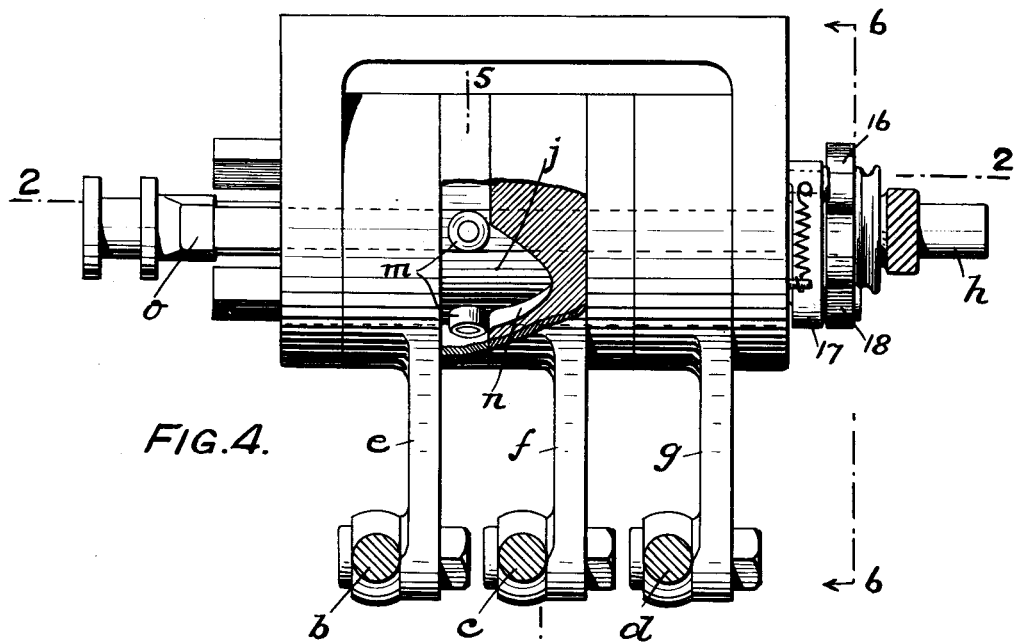
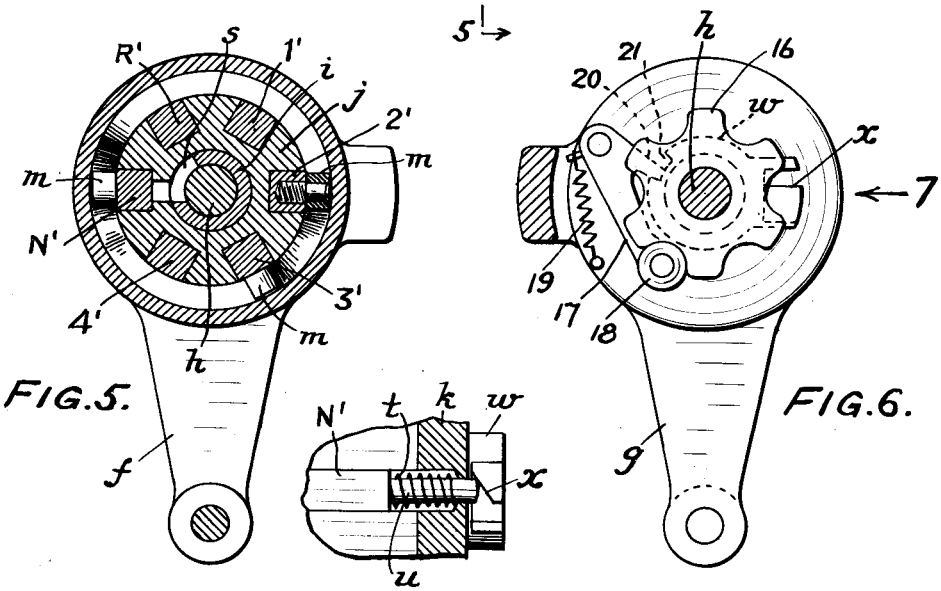
WITNESSES:
INVENTOR
Dean C. Lewis
BY
ATTORNEY.

D. C. LEWIS.
MECHANICALLY OPERATED GEAR CHANGING MECHANISM FOR AUTOMOBILES.
APPLICATION FILED MAY 16, 1913.

1,092,922.

Patented Apr. 14, 1914.

3 SHEETS—SHEET 3.

WITNESSES:

INVENTOR
Dean C. Lewis
BY
ATTORNEY.

UNITED STATES PATENT OFFICE.

DEAN C. LEWIS, OF READING, PENNSYLVANIA.

MECHANICALLY-OPERATED GEAR-CHANGING MECHANISM FOR AUTOMOBILES.

1,092,922.  Specification of Letters Patent.  Patented Apr. 14, 1914.

Application filed May 16, 1913. Serial No. 767,970.

*To all whom it may concern:*

Be it known that I, DEAN C. LEWIS, a citizen of the United States, residing at Reading, county of Berks, and State of Pennsylvania, have invented a new and useful Improvement in Mechanically-Operated Gear-Changing Mechanism for Automobiles, of which the following is a full, clear, and exact description, reference being had to the accompanying drawings, which form a part of this specification.

The object of my invention is to provide for changing gears of an automobile in such manner that the operator, by the mere swing of a lever, or by the operation of some equally simple device to some predetermined position, may so adjust mechanism that upon operating the ordinary clutch shifting contrivance, the said mechanism will coöperate with other mechanism to effect the shift of the gears to a position corresponding to the position of said lever.

A preferred embodiment of my invention is shown in the drawings, in which—

Figure 2:
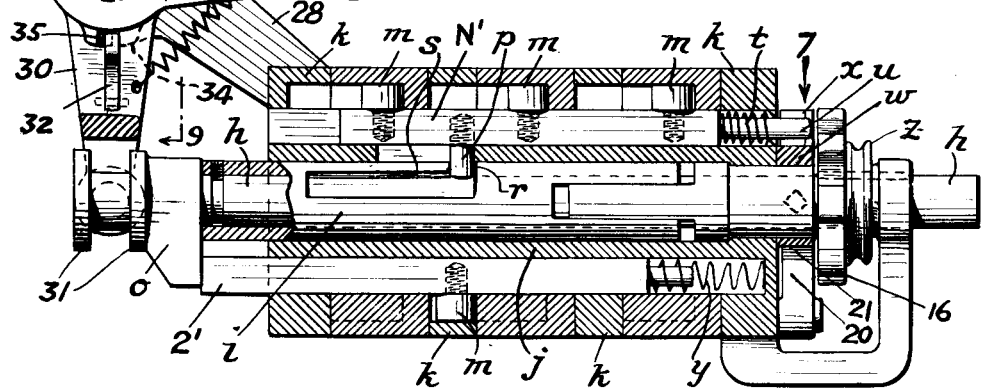
Figure 3:
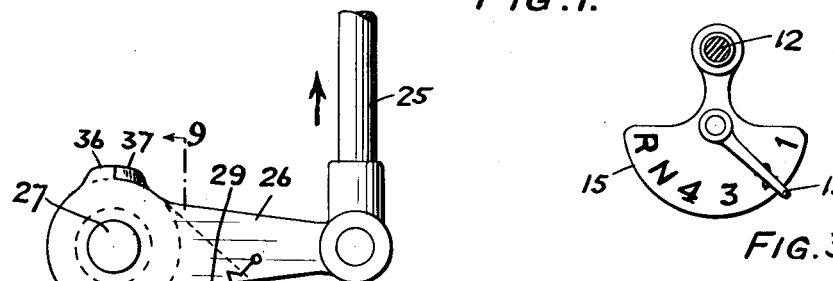
Figure 8:
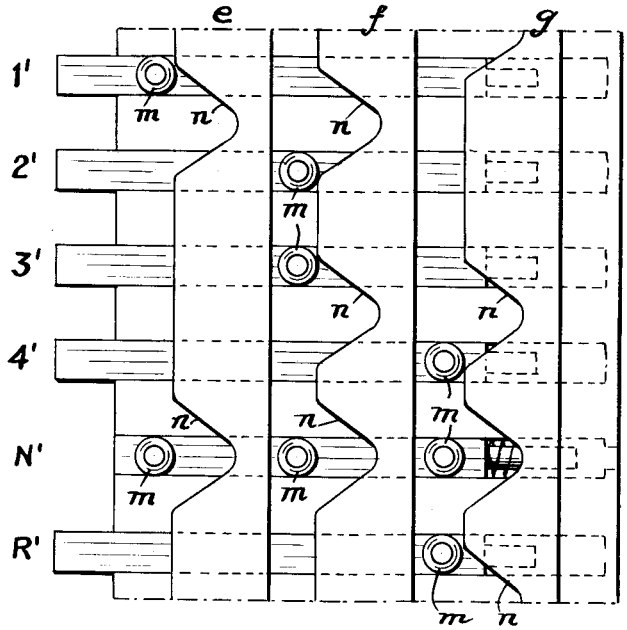
Figure 9:
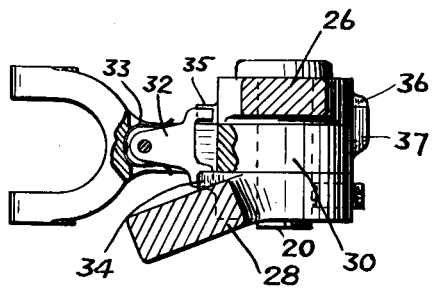

Figure 1 is a partial side elevation of a car with my invention applied thereto; Fig. 2 is a horizontal sectional view through the casing containing the positioning devices and actuating mechanism more directly connected with the gear casing, the same being taken on the line 2—2 of Fig. 4; Fig. 3 is an enlarged detail plan view of the selective indicator and handle lever; Fig. 4 is a side elevation, partly broken away, of the parts shown in Fig. 2; Fig. 5 is a cross section on the line 5—5 of Fig. 4; Fig. 6 is a cross section on the line 6—6 of Fig. 4; Fig. 7 is a detail view looking in the direction of the arrow 7, Figs. 2 and 6; Fig. 8 is a developed view of the gear-operating arm hubs and the actuating slide bars; Fig. 9 is a detail sectional view on the line 9—9 of Fig. 2.

The gear case $a$ contains any convenient arrangement of change gears adapted to be shifted by means of rods $b$ $c$ and $d$ connected respectively to levers or arms $e$ $f$ and $g$. It may be conveniently assumed that the gears are arranged so as to have four different positions adapted to dictate as many different speeds and another position to provide for reversing the direction of motion. It may also be assumed that when the arms $e$ $f$ and $g$ are brought to a median position the gears are shifted to a neutral position; that arm $e$ is adapted, when swung to one side of its median position, to shift the gears into the first speed position; that arm $f$ is adapted, when swung to opposite sides of its median position, to shift the gears into respectively the second and third speed positions; and that arm $g$ is adapted, when swung to opposite sides of its central position to shift the gears respectively into the fourth speed position and into position to reverse. The above described change-gear mechanism is typical of those in common use and hence no description of the arrangement of the gears themselves is necessary. It will be understood, however, that the gear positions may vary in number and that the different arms may control other combinations of speed and direction positions.

The arms $e$, $f$ and $g$, are arranged to swing about the axis of a shaft $h$. On this shaft is a sleeve $i$ which is movable longitudinally with the shaft, and is also capable of a limited turning movement thereon, as will be hereinafter described. Surrounding the sleeve $i$ is a casing $j$. The hubs of the several arms $e$, $f$, $g$ are arranged to turn on the casing $j$, being confined from moving axially of the shaft by spacing rings $k$, integral with the casing, the outer faces of which are flush with the outer faces of said hubs.

The casing $j$ is provided with a series of longitudinal extending recesses in which are slidable a series of bars corresponding to the several arrangements of the change gears in the gear case $a$. For convenience of description, these bars are marked respectively $N'$, $R'$, $1'$, $2'$, $3'$, and $4'$, representing respectively the bar for controlling the shift of the gears to the neutral position, the bar for controlling the shift of the gears to effect reversal, and the bars for controlling the movement of the gears into the first, second, third and fourth speed positions.

As shown in the developed view, Fig. 8, the positioning bars actuate the hubs of the arms $e$, $f$ and $g$, to turn them on the casing $j$, by means of rollers $m$ which, when the bars are moved longitudinally forward, engage cam recesses $n$ in the hubs of the arms. The casing is cut away to allow the rollers to move therethrough in the sliding movement of the bars.

In the typical arrangement shown in Fig. 8, the bar $1'$ is adapted to turn the arm $e$ to shift the gears to the first speed position, the bar $2'$ is adapted to turn the arm $f$ to shift the gears to the second speed position;

the bar 3' is adapted to turn the arm f to shift the gears to the third speed position; the bar 4' is adapted to turn the arm g to shift the gears to the fourth speed position;
the bar R' is adapted to turn the arm g to shift the gears into position to reverse, while the bar N' carries rollers which engage cams on all three arms e, f and g and thereby shift all three arms e, f and g into the intermediate position which throws the gears into their neutral position.

If it is desired to shift the gears to the neutral position the bar N' alone is advanced, thereby turning to the neutral position any of the arms e, f and g that have been turned to one of the other positions, after which the bar N' recedes to its inoperative position, the arms remaining in the positions to which they have moved. If it is desired to shift from neutral position to one of the other positions, say to the second speed position, bar N' is first caused to advance and recede and then the bar 2' is caused to advance and recede, the operation of bar N having no effect, but the operation of bar 2' turning the arm f to one side of its median position, thereby shifting the gears to the second speed position. If it is desired to shift from the second speed position to the third speed position, bar N' is first caused to advance and recede and then bar 3' is caused to advance and recede, the bar N' operating to turn the arm f to its median position, while bar 3' operates to swing the arm to the other side of its median position, thereby shifting the gears to the third speed position. In the same way, in shifting from any given position except neutral to any other given position except neutral, both bar N' and the bar corresponding to the shift desired are successively operated. The means whereby the actuation of these bars may be controlled from the steering head will now be described.

The shaft h carries at one end a pusher block o which, by turning the shaft, may be brought into alinement with any one of the positioning bars R', N', 1', 2', 3', 4'. After the gears have been shifted to any given position, all the positioning bars have been moved to the left, Fig. 2, into the position in which bar 2' is shown, and the shaft h and pusher o have been moved to the left of the position shown in Fig. 2, this figure showing the parts in the median position of the shaft. When means (hereinafter described) are operated to push the shaft forward, the pusher o, if brought into line with either one of the bars R', 1', 2', 3' and 4', will operate that bar during the last half of its movement to the right. If the pusher o is turned opposite the bar N', it will not directly operate that bar, the end of which does not project far enough to enable the pusher o to engage it; but on each forward movement of the shaft (whether the pusher o is turned to aline with bar N' or with any of the other blocks), the bar N' will be operated during the first half of the movement of the shaft, as will now be described.

Threaded in the bar N' is a pin p which projects into a slot s in the sleeve i. The slot s is provided at one side with an offset recess r. Into this recess the pin p extends when the shaft is in its retracted position. As the shaft h is pushed forward, the bar N' is thus caused to move forward with the shaft. Near the front end of the shaft, the sleeve i carries a disk w provided with a cam x. In the forward movement of the bar N' a rod u on the end thereof engages the cam x and thereby turns the sleeve i until the pin p moves, relatively speaking, out of the recess r into the main part of the slot s, whereupon a spring t, surrounding the rod u and which has been compressed in the forward movement of the bar N', returns the bar N' to its original position. This occurs while the shaft h is being pushed forward during the first half of its forward movement.

As before stated, during the final half of the advance movement of the shaft, the pusher o engages the end of any one of the other positioning bars with which it has been alined and slides it forward. In front of each of these positioning bars R', 1', 2', 3' and 4', is a spring y, which is compressed as its corresponding bar is pushed forward, and operates to return the bar as the shaft h is returned by its actuating means.

To turn the shaft h into one of its several radial positions, the front of the shaft carries a pulley z, which is connected, by means of a suitable power transmitting belt or cable 10, with a pulley 11 on the end of a shaft 12, which is arranged alongside the shaft of the steering wheel 14 and is provided, at its top, close to the steering wheel, with a handle 13. By means of this handle the shaft h may be turned to any one of its several positions. To guide the operator, an indicator 15, supported from the steering wheel shaft and the shaft 12, is arranged beneath the handle and is provided with characters corresponding to the several positions of the gears.

The shaft h carries a star-wheel 16 which is engaged by a roller 18 on the end of one arm 17 of a two armed lever. As the shaft h is turned the roller rides over the teeth of the wheel. A spring 19 turns the arm 17 to cause the roller 18 to settle between adjacent teeth of the wheel 16, thereby both accurately positioning the shaft h and holding it in such position.

It will be observed that the disk w on the sleeve i has a recess 21 into which the short arm 20 of the lever 17—20 extends. As the shaft, which is of course in its retracted position when it is turned by the operator, is turned on its axis away from any given position, the roller 18 rides out of the recess with which it is engaged, and the lever 17—20 is turned on its pivot to cause the arm 20 thereof to turn the sleeve $i$ into position to bring the pin $p$ into the offset recess $r$ of the slot $s$, thereby again bringing the bar N' into operative relation with the shaft $h$, so that when the shaft is again moved forward the bar N' will be operated as above described.

The means for operating the shaft $h$ and pusher $o$ will now be described. At the steering head of the car is the clutch lever 23, which is present in some form in all automobiles of the gasolene type. As is well understood, the clutch must be released at the time the change gears are operated, and I have therefore connected the means for actuating the pusher $o$ with this clutch lever. The clutch lever has a pin 24, which works in a slotted link 25 which is pivotally connected with an arm 26 loosely mounted on a stud 27 secured to a bracket 28 on the casing of the change gear actuating mechanism. On the stud 27 is also pivoted an arm 30 which is connected with the arm 26 by means of a spring 29. The end of the arm 30 is forked and surrounds the end of the shaft between two collars 31 thereon.

When the link 25 is moved by the clutch lever 23 in the direction of the arrow, Fig. 2, the spring 29 tends to move the arm 30. That is, the arms 26 and 30 tend to move as the arms of an ordinary bell-crank lever, and they so move during the first half of the movement of arm 26. It is desired, however, to impart a more rapid or sudden movement to the arm 30, during the latter half of its movement, than would be effected by its movement in harmony with the arm 26, and therefore means are provided to lock the arm 30 from movement after the parts are brought into the median position in Fig. 2, until the arm 26 has nearly completed its movement. This is effected by pivoting on the arm 30 a lever 32 (see Figs. 2 and 9), which is held normally in a central position by means of a spring 33, and in providing a stop 34 on the bracket 28 against which the lever 32 abuts and thereby prevents the arm 30 from partaking of the forward movement of the arm 26. The hub of the arm 26 carries a cam 35 which, after the arm 26 has advanced to nearly its limit of movement, turns the lever 32 until it clears the stop 34; whereupon the arm 30, being no longer locked, is quickly advanced by the spring 29 into position to quickly move the shaft $h$ and the pusher $o$ forward.

Coacting stops 36 and 37 on the hubs of arms 26 and 30 respectively, limit the forward movement of the arm 30, and also operate, on the return movement of the arm 26, to cause the arm 30 to move with the arm 26.

A spring 38, connecting the link 25 with the car frame, returns the link 25 to its normal position when clutch lever 23 is released.

Having now fully described my invention, what I claim and desire to protect by Letters Patent is:

1. In a gear changing mechanism for automobiles, the combination with gear shifting arms having cams thereon, of a series of movable bars corresponding with different positions to which the gears are shiftable, members on the bars adapted, when the bars are actuated, to engage corresponding cams and thereby operate the arms, means to actuate the bars, and means to bring the bar-actuating means into operative relation with any one of the several bars.

2. In a gear changing mechanism, the combination with gear shifting arms having hubs turnable about a common axis, and cams on the hubs, of a series of bars slidable longitudinally in the direction of said axis and corresponding to different positions to which the gears are shiftable, members on the bars adapted, when the bars are advanced, to engage corresponding cams and thereby operate the arms, means to so actuate the bars, and means to turn the bar-actuating means around said axis and thereby bring the same into operative relation with any one of the several bars.

3. In a gear changing mechanism for automobiles, in combination, a shaft, means to turn the shaft, a pusher turning with the shaft, a series of bars, corresponding with different positions to which the gears are shiftable, arranged around and extending longitudinally of the shaft, means to operate the pusher to longitudinally advance the bar alining therewith, gear shifting arms and means enabling each bar when advanced to operate one of said arms.

4. In a gear changing mechanism for automobiles, in combination, a shaft, means to turn the shaft, a pusher turning with the shaft, a series of bars, corresponding with different positions to which the gears are shiftable, arranged around and extending longitudinally of the shaft, means to operate the pusher to longitudinally advance the bar alining therewith, gear shifting arms, cams thereon and members on the bars adapted, when the bars are so advanced, to engage corresponding cams and thereby operate the arms.

5. In a gear changing mechanism for automobiles, in combination, a shaft, means to turn the shaft, a pusher turning with the shaft, a series of bars, corresponding with different positions to which the gears are shiftable, arranged around and extending longitudinally of the shaft, means to operate the pusher to longitudinally advance the bar alining therewith, gear shifting arms having hubs turnable on said shaft, cams on said hubs, and members on the bars adapted, when the bars are so advanced, to engage corresponding cams and thereby turn the arms.

6. In a gear shifting mechanism for automobiles, the combination with gear shifting arms, of a series of movable bars corresponding with different positions to which the gears are shiftable, means enabling each bar when actuated to operate one or more of said arms, bar actuating means adapted in each advance movement to actuate the same one of said bars, and means to move the bar actuating means into operative relation with any one of the other bars.

7. In a gear shifting mechanism for automobiles, the combination with gear-shifting arms movable into position to shift the gears into a neutral position, each of which is also movable to shift the gears into one of the speed or direction positions, of a series of movable bars corresponding with said different gear positions, means enabling one bar to move all of said arms into the neutral position, means enabling each of the other bars to move one of said arms into one of the other positions, bar-actuating means adapted in each advance movement to operate the first bar, and means to move the bar-actuating means into position to operate in its advance movement any one of the other bars.

8. In a gear shifting mechanism for automobiles, the combination with gear shifting arms movable into position to shift the gears into a neutral position, each of which is also movable to shift the gears into one of the speed or direction positions, of a series of movable bars corresponding with said different gear positions, each arm having a cam adapted to coöperate with one of the bars to effect the movement of all the arms into the neutral position, one or more other cams on each arm each of which is adapted to coöperate with one of the other bars to effect the movement of its arm into one of the other positions, bar-actuating means adapted in each advance movement to operate the first bar, and means to move the bar-actuating means into position to operate in its advance movement any one of the other bars.

9. In a gear shifting mechanism, the combination with gear-shifting arms having hubs turnable about a common axis into a medium position to shift the gears to a neutral position, each of which is also turnable from its medium position to shift the gears into one of the speed or direction positions, of a series of movable bars corresponding with the different gear positions, each hub having a cam adapted to coöperate with one of the bars to turn all the arms into median position, one or more other cams on each hub, each of which is adapted to coöperate with one of the other bars to effect the turning of its arm to one side of said median position, bar actuating means adapted in each advance movement to operate the first bar, and means to move the bar-actuating means into position to operate in its advance movement any one of the other bars 10. In a gear shifting mechanism for automobiles, in combination, a shaft, a pusher turning with the shaft, means to advance the pusher, gear-shifting arms movable into position to shift the gears into a neutral position, each of which is also movable to shift the gears into one of the speed or direction positions, a series of longitudinally movable bars arranged around and extending longitudinally of the shaft, means enabling one bar to move all of said arms into a neutral position, means enabling each of the other bars to move one of said arms into one of the other positions, means enabling the first bar to be advanced with each advance of the pusher, and means to turn the shaft to bring the pusher into operative relation with any one of the other bars.

11. In a gear shifting mechanism for automobiles, in combination, a shaft, a pusher turning with the shaft, means to advance the pusher, gear shifting arms having hubs turnable about the shaft into a median position to shift the gears to a neutral position, each of which is also turnable from its median position to shift the gears into one of the speed or direction positions, a series of longitudinally movable bars arranged around and extending longitudinally of the shaft, each hub having a cam adapted to coöperate with one of the bars to turn all the arms into neutral position, one or more other cams on each hub each of which is adapted to coöperate with one of the other bars to effect the turning of its arm to one side of said median position, means enabling the first bar to be advanced with each advance of the pusher, and means to turn the shaft to bring the pusher into operative relation with any one of the other bars.

12. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, gear shifting arms, and means enabling each bar when advanced to operate one of said arms.

13. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, gear shifting arms having hubs turnable on said shaft, cams on said hubs, and means on the bars adapted, when the bars are advanced, to engage corresponding cams and thereby turn the arms.

14. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, an additional positioning bar, means enabling the shaft in its advance movement to advance the last named bar, gear-shifting arms, and means enabling said bars to operate said arms.

15. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, an additional positioning bar, means enabling the shaft in its advance movement to operate the last named bar, gear shifting arms, each of which is adapted to be moved to shift the gears to neutral and also to be moved to shift the gears to one of its speed or direction positions, each arm having a cam adapted to coöperate with the last named bar to effect the movement of said arms into the neutral position, and a cam on each arm adapted to coöperate with one of the first named bars to effect the movement of said arm into one of the speed or direction positions.

16. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, an additional positioning bar, means enabling the shaft in its advance movement to advance said additional bar, means operable when said additional bar is advanced to effect its return, gear shifting arms, and means enabling said bars to operate said arms.

17. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, a sleeve on the shaft and movable longitudinally therewith and provided with a recessed slot, an additional positioning bar, a pin on the last named bar adapted to extend into the recess of the slot whereby the last named bar is advanced in the advance movement of the shaft, means operable when the last-named bar is advanced to effect its return, gear shifting arms, and means enabling said bars in their advance movement to operate said arms.

18. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, an additional positioning bar, means enabling the shaft in its advance movement to successively advance and release the last named bar, a spring operating to return the bar, gear-shifting arms, and means enabling said bars to operate said arms.

19. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, a sleeve on the shaft and movable longitudinally therewith and turnable thereon, an additional positioning bar normally in operative engagement with the sleeve but adapted to be released therefrom when the sleeve is turned from its normal position, means operated by the last-named bar in the advance movement of the shaft and sleeve to so turn the sleeve and thus release the bar, a spring operating to return the last-named bar when so released, gear-shifting arms, and means enabling said bars to operate said arms.

20. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, a sleeve on the shaft and movable longitudinally therewith and turnable thereon, an additional positioning bar normally in operative engagement with the sleeve but adapted to be released therefrom when the sleeve is turned from its normal position, a cam carried by the sleeve and adapted in the advance movement of the last named bar to be operated thereby to so turn the sleeve and thus release the bar, a spring operating to return the last named bar when so released, gear shifting arms, and means enabling said bars to operate said arms.

21. In a gear shifting mechanism for automobiles, in combination, a shaft, positioning bars extending and movable longitudinally of the shaft, a pusher on the shaft adapted to be turned into alinement with any of said bars, means to advance the shaft and pusher longitudinally thereby operating one of said bars, a sleeve on the shaft and movable longitudinally therewith and provided with a recessed slot, an additional positioning bar, a pin on the last named bar adapted to extend into the recess of the slot whereby the last named bar is advanced in the advance movement of the shaft, a cam carried by the sleeve and adapted in the advance movement of the last named bar to be operated thereby to turn the sleeve and move the recess away from the pin, a spring adapted to return the last named bar, gear-shifting arms, and means enabling said bars to operate said arms.

22. In a gear shifting mechanism for automobiles, in combination, a shaft, positioning bars extending and movable longitudinally of the shaft, a pusher on the shaft, means to turn the shaft to bring the pusher into alinement with any of said bars, means to advance the shaft and pusher longitudinally thereby operating one of said bars, a sleeve on the shaft and movable longitudinally therewith and turnable thereon, an additional positioning bar normally in operative engagement with the sleeve but adapted to be released therefrom when the sleeve is turned from its normal position, means operable by the last-named bar in the advance movement of the shaft and sleeve to so turn the sleeve and thus release the bar, a spring operating to return the last-named bar when so released, gear-shifting arms, means enabling said bars to operate said arms, and means operated by the shaft in its turning movement to turn the sleeve into operative engagement with the additional positioning bar.

23. In a gear shifting mechanism for automobiles, in combination, a shaft, positioning bars extending and movable longitudinally of the shaft, a pusher on the shaft, means to turn the shaft to bring the pusher into alinement with any of said bars, means to advance the shaft and pusher longitudinally thereby operating one of said bars, a sleeve on the shaft and movable longitudinally therewith and turnable thereon, an additional positioning bar normally in operative engagement with the sleeve but adapted to be released therefrom when the sleeve is turned from its normal position, means operable by the last-named bar in the advance movement of the shaft and sleeve to so turn the sleeve and thus release the bar, a spring operating to return the last-named bar when so released, gear-shifting arms, means enabling said bars to operate said arms, a star-wheel on the shaft, and a lever engaging the star-wheel and the sleeve and adapted in the turning movement of the shaft to turn the sleeve into operative engagement with the additional positioning bar.

24. In a gear shifting mechanism for automobiles, in combination, a shaft, positioning bars extending and movable longitudinally of the shaft, a pusher on the shaft, means to turn the shaft to bring the pusher into alinement with any of said bars, means to advance the shaft and pusher longitudinally thereby operating one of said bars, a sleeve on the shaft and movable longitudinally therewith and turnable thereon and provided with a recessed slot, an additional positioning bar, a pin on the last-named bar adapted to extend into the recess of the slot whereby the last named bar is advanced in the advance movement of the shaft, a cam carried by the sleeve and adapted in the advance movement of the last-named bar to be operated thereby to turn the sleeve and move the recess away from the pin, a spring adapted to return the last-named bar, gear shifting arms, means enabling said bars to operate said arms, a star-wheel on the shaft, and a lever engaging the star-wheel and the sleeve and adapted in the turning movement of the shaft to turn the sleeve and thereby cause said pin to again enter said recess.

25. In a gear shifting mechanism for automobiles, in combination, a shaft, positioning bars extending and movable longitudinally of the shaft, gear-shifting arms, means enabling said bars to operate said arms, a pusher on the shaft, means to turn the shaft to bring said pusher into alinement with any of said bars, an arm adapted to operate said pusher, a second arm and means to operate the same, a spring tending to operate the first arm when the second arm is operated, a stop holding the first arm from so operating, and means operating in said movement of the second arm to render the stop inoperative and thus permit the spring to operate the first arm.

26. In a gear shifting mechanism for automobiles, in combination, a shaft, positioning bars extending and movable longitudinally of the shaft, gear-shifting arms, means enabling said bars to operate said arms, a pusher on the shaft, means to turn the shaft to bring said pusher into alinement with any of said bars, an arm adapted to operate said pusher, a second arm and means to operate the same, a spring tending to operate the first arm when the second arm is operated, a lever on the first arm, a stop normally engaging the lever and preventing the first arm from moving with the second arm, and a cam on the second arm adapted, as the latter is moved, to actuate said lever to withdraw it from the stop, thus permitting the spring to operate the first arm.

27. In a gear shifting mechanism for automobiles, in combination, a shaft, positioning bars extending and movable longitudinally of the shaft, gear-shifting arms, means enabling said bars to operate said arms, a pusher on the shaft, means to turn the shaft to bring said pusher into alinement with any of said bars, a bracket, a stud thereon, an arm pivoted on said stud and engaging said shaft and adapted to move it forward, a second arm on the stud at an angle to the first arm, means to turn the second arm, coöperating stops on the two arms, a spring tending to turn the first arm when the second arm is turned in one direction, a stop on the bracket adapted to hold the first arm from so turning, and means operating in said turning movement of the second arm to render the last-named stop inoperative and thus permit the spring to turn the first arm.

28. In a gear shifting mechanism for automobiles, in combination, a shaft, positioning bars extending and movable longitudinally of the shaft, gear-shifting arms, means enabling said bars to operate said arms, a pusher on the shaft, means to turn the shaft to bring said pusher into alinement with any of said bars, a bracket, a stud thereon, an arm pivoted on said stud and engaging said shaft and adapted to move it forward, a second arm on the stud at an angle to the first arm, means to turn the second arm, coöperating stops on the two arms, a spring tending to turn the first arm when the second arm is turned in one direction, a lever on the first arm, a stop on the bracket adapted to engage the lever and prevent the first arm from turning with the second arm, and a cam on the second arm adapted, as the latter is turned, to actuate the lever to withdraw it from the last named stop, thus permitting the spring to turn the first arm and advance the shaft and pusher.

29. In a gear-changing mechanism for automobiles, in combination, a shaft, gear shifting arms, having cams, slidable positioning bars adapted to coöperate with the several cams to actuate said arms, manually controlled means to turn the shaft and bring the same into operative relation with the different bars, and manually-controlled means to move the shaft longitudinally and thereby slide any bar in operative relation with the shaft to cause the same to actuate one of said arms.

30. In a gear-changing mechanism for automobiles, in combination, a shaft, gear-shifting arms the hubs of which are turnable about the shaft, said hubs having cams, slidable bars extending longitudinally of and arranged about the shaft, members on the bars, one for each cam, adapted in the sliding movement of the bars to engage said cams and thereby turn the arms, manually-controlled means to turn the shaft and bring the same into operative relation with the different bars, and manually controlled means to move the shaft longitudinally and thereby slide any bar in operative relation with the shaft to cause the same to actuate one of said arms.

In testimony of which invention, I have hereunto set my hand, at Reading, Pa., on this 14th day of May, 1913.

DEAN C. LEWIS.

Witnesses:
HENRY B. HINTZ,
SARA E. GARRETT.